US010821359B2

(12) United States Patent
Aronzon

(10) Patent No.: US 10,821,359 B2
(45) Date of Patent: *Nov. 3, 2020

(54) APPARATUS AND METHOD FOR MANAGING USER INPUTS IN VIDEO GAMES

(71) Applicant: STEELSERIES ApS, Frederiksberg (DK)

(72) Inventor: Michael Aronzon, Vaughan (CA)

(73) Assignee: STEELSERIES ApS, Frederiksberg (DK)

( * ) Notice: Subject to any disclaimer, the term of this patent is extended or adjusted under 35 U.S.C. 154(b) by 0 days.

This patent is subject to a terminal disclaimer.

(21) Appl. No.: 16/251,289

(22) Filed: Jan. 18, 2019

(65) Prior Publication Data
US 2019/0151755 A1 May 23, 2019

Related U.S. Application Data

(63) Continuation of application No. 15/656,051, filed on Jul. 21, 2017, now Pat. No. 10,220,312, which is a (Continued)

(51) Int. Cl.
*A63F 13/355* (2014.01)
*A63F 13/87* (2014.01)
(Continued)

(52) U.S. Cl.
CPC ............ *A63F 13/355* (2014.09); *A63F 13/02* (2013.01); *A63F 13/06* (2013.01); *A63F 13/10* (2013.01);
(Continued)

(58) Field of Classification Search
None
See application file for complete search history.

(56) References Cited

U.S. PATENT DOCUMENTS 6,192,340 B1 2/2001 Abecassis
6,227,974 B1 5/2001 Eilat et al.
(Continued)

FOREIGN PATENT DOCUMENTS

| IN | 5122/DELNP/2013 | 5/2016 |
| JP | 2011-119791 | 4/1999 |
| WO | 2003/058518 | 7/2003 |

*Primary Examiner* — Ronald Laneau
(74) *Attorney, Agent, or Firm* — Guntin & Gust, PLC; John G. Rauch

(57) ABSTRACT

A system that incorporates teachings of the present disclosure may include, for example, a computing device having a controller to obtain a user input that was inputted into a first accessory operably coupled with the computing device where the first accessory provides a user interface for user interaction with a video game, determine a language of an intended recipient of the user input based on an identity of the intended recipient, access a multi-lingual library comprising a plurality of words associated with the video game, match the user input to one or more words of the plurality of words of the multi-lingual library to generate a translated message in the determined language of the intended recipient, and provide the translated message to a second accessory for presentation to the intended recipient in real-time. Additional embodiments are disclosed.

20 Claims, 9 Drawing Sheets

Related U.S. Application Data continuation of application No. 14/924,127, filed on Oct. 27, 2015, now Pat. No. 9,744,451, which is a continuation of application No. 14/573,539, filed on Dec. 17, 2014, now Pat. No. 9,199,174, which is a continuation of application No. 13/683,737, filed on Nov. 21, 2012, now Pat. No. 8,939,837, which is a continuation of application No. 12/947,874, filed on Nov. 17, 2010, now Pat. No. 8,337,305.

(51) Int. Cl.

| | |
|---|---|
| *A63F 13/335* | (2014.01) |
| *G06F 9/451* | (2018.01) |
| *A63F 13/98* | (2014.01) |
| *A63F 13/20* | (2014.01) |
| *A63F 13/40* | (2014.01) |
| *G06F 40/58* | (2020.01) |
| *G06F 40/263* | (2020.01) |
| *A63F 13/215* | (2014.01) |
| *A63F 13/35* | (2014.01) |
| *G10L 13/04* | (2013.01) |
| *G06F 3/0489* | (2013.01) |
| *A63F 13/30* | (2014.01) |
| *A63F 13/25* | (2014.01) |
| *A63F 13/54* | (2014.01) |
| *A63F 13/79* | (2014.01) |

(52) U.S. Cl.
CPC ............ *A63F 13/12* (2013.01); *A63F 13/215* (2014.09); *A63F 13/25* (2014.09); *A63F 13/335* (2014.09); *A63F 13/35* (2014.09); *A63F 13/40* (2014.09); *A63F 13/87* (2014.09); *G06F 3/0489* (2013.01); *G06F 9/454* (2018.02); *G06F 40/263* (2020.01); *G06F 40/58* (2020.01); *G10L 13/043* (2013.01); *A63F 13/54* (2014.09); *A63F 13/79* (2014.09); *A63F 2300/308* (2013.01); *A63F 2300/538* (2013.01); *A63F 2300/572* (2013.01); *A63F 2300/6063* (2013.01)

(56) References Cited

U.S. PATENT DOCUMENTS

| | | |
|---|---|---|
| 6,638,169 B2 | 10/2003 | Wilder et al. |
| 7,631,040 B1 | 12/2009 | Hushyar et al. |
| 7,814,163 B2 | 10/2010 | Lee |
| 7,883,420 B2 | 2/2011 | Bradbury et al. |
| 7,892,178 B1 | 2/2011 | Bady et al. |
| 7,932,892 B2 | 4/2011 | Chen |
| 7,970,147 B2 | 6/2011 | Mao |
| 8,065,240 B2 | 11/2011 | Jung |
| 8,439,751 B2 | 5/2013 | Yerli et al. |
| 8,485,899 B1 | 7/2013 | Rom et al. |
| 8,556,721 B2 | 10/2013 | Rom et al. |
| 8,570,378 B2 | 10/2013 | Zalewski et al. |
| 8,577,049 B2 | 11/2013 | Guntin et al. |
| 8,797,260 B2 | 8/2014 | Mao et al. |
| 8,834,266 B2 | 9/2014 | Thorner et al. |
| 9,737,796 B2 * | 8/2017 | Soelberg ................. G06F 3/017 |
| 10,471,348 B2 * | 11/2019 | Vonderhaar ............. A63F 13/34 |
| 10,537,794 B2 * | 1/2020 | Soelberg ................ H01F 7/0273 |
| 2004/0210923 A1 | 10/2004 | Hudgeons et al. |
| 2009/0209319 A1 | 8/2009 | Okada |
| 2011/0065503 A1 | 3/2011 | Wolff-Petersen et al. |
| 2017/0319958 A1 | 11/2017 | Aronzon |

* cited by examiner

APPARATUS AND METHOD FOR MANAGING USER INPUTS IN VIDEO GAMES

CROSS-REFERENCE TO RELATED APPLICATIONS

This application is a continuation of U.S. patent application Ser. No. 15/656,051 filed Jul. 21, 2017, which is a continuation of U.S. patent application Ser. No. 14/924,127 filed Oct. 27, 2015 (now U.S. Pat. No. 9,744,451), which is a continuation of U.S. patent application Ser. No. 14/573,539 filed Dec. 17, 2014 (now U.S. Pat. No. 9,199,174), which is a continuation of U.S. patent application Ser. No. 13/683,737, filed Nov. 21, 2012 (now U.S. Pat. No. 8,939,837), which is a continuation of U.S. patent application Ser. No. 12/947,874 filed Nov. 17, 2010 (now U.S. Pat. No. 8,337,305). All sections of the aforementioned application(s) and patent(s) are incorporated herein by reference in their entirety.

FIELD OF THE DISCLOSURE

The present disclosure relates generally to management applications, and more specifically to an apparatus and method for managing user inputs in video games.

BACKGROUND

It is common today for video games to allow multiple gamers to play simultaneously, such as online or offline. This is especially true of gamers who play Massively Multiplayer On-line (MMO) games in a team or individual configuration.

These gamers can be located in different areas, including different countries, and may or may not know each other.

DETAILED DESCRIPTION

Figure 1:
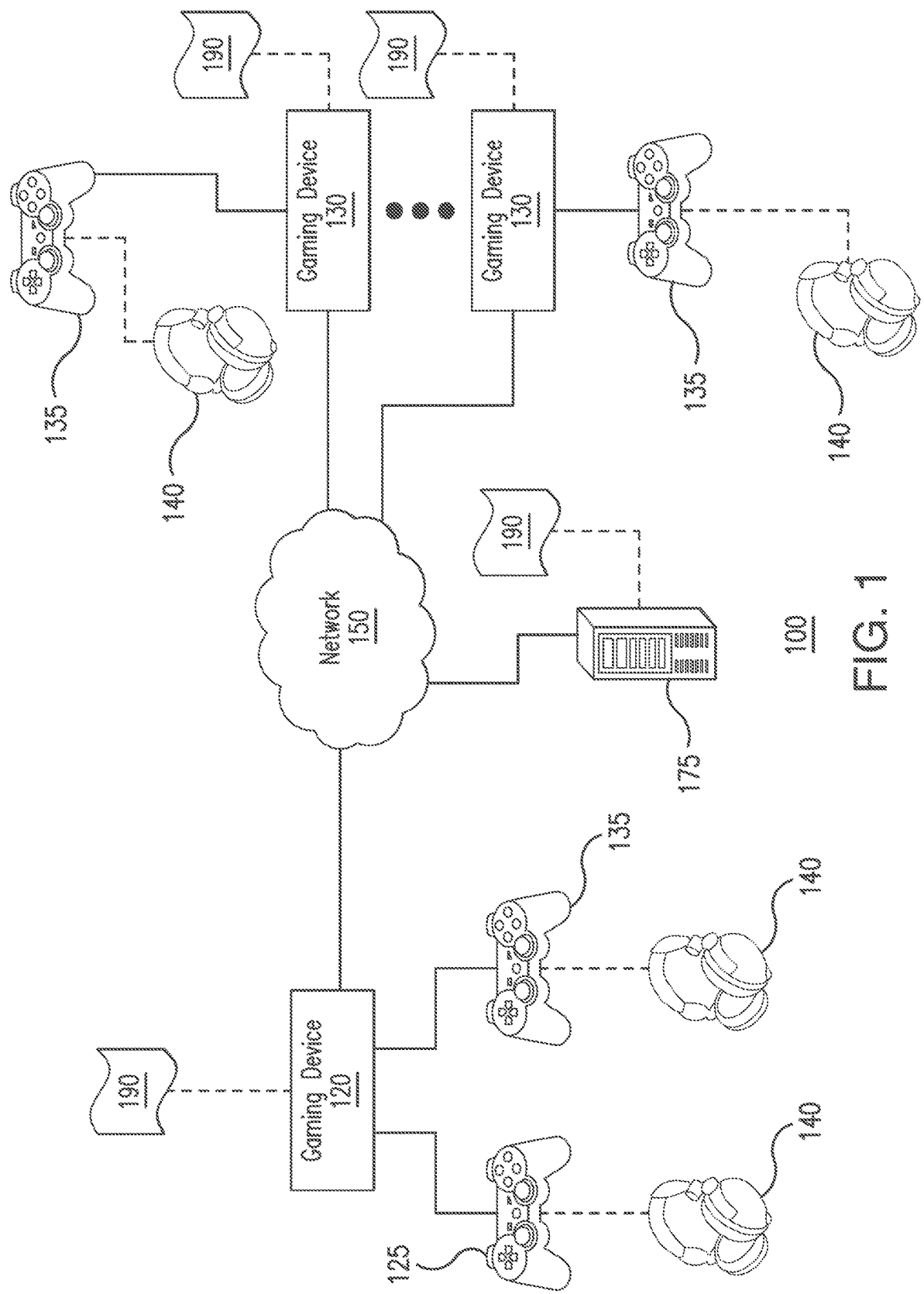
FIG. 1 depicts an illustrative embodiment of a communication system according to the present disclosure.

The embodiments described herein illustrate devices and/or methodologies that allow gamers to communicate with each other, even when the gamers speak different languages. One or more of the embodiments can translate user inputs into other languages that are identified with the intended recipient(s). The user inputs can be speech and/or non-speech (e.g., actuations of accessory buttons such as depressing a combination of keys that represent particular words). The translation can be performed by a number of different devices, including the source device, the recipient device, and/or a remote server (e.g., a service provider server that is in communication with the source and recipient devices, such as via the Internet). One or more of the embodiments allow for configuration of a processor with the identity of gamers and their respective languages. The processor can also be configured to detect certain words or phrases, which can be translated to the language of each other gamer. One or more of the embodiments can provide for transmission of codes to other processors, which then locally invokes translation. Other embodiments are also contemplated.

One embodiment of the present disclosure entails a non-transitory computer-readable storage medium that includes computer instructions to receive a signal generated in response to a user input at a first accessory operably coupled with a first computing device, where the first computing device is programmed to present a video game. The computer instructions can also determine a language for an intended recipient of the user input and can provide an audio signal to a second accessory for presentation to the intended recipient. The audio signal can be generated based on the received signal and the determined language using a multi-lingual library. The audio signal can be associated with the video game.

One embodiment of the present disclosure entails a method including obtaining a user input that was inputted into a first accessory operably coupled with a first computing device, where the first computing device is programmed to present a video game. The method can also include determining a language of an intended recipient of the user input based on an identity of the intended recipient and translating the user input into a translated message using the determined language and a multi-lingual library. The method further can include providing the translated message to a second accessory for presentation to the intended recipient in real-time, where the translated message is associated with the video game.

One embodiment of the present disclosure entails a computing device having a controller to obtain a user input that was inputted into a first accessory operably coupled with the computing device, where the first accessory provides a user interface for user interaction with a video game. The controller can also be programmed to determine a language of an intended recipient of the user input based on an identity of the intended recipient and access a multi-lingual library comprising a plurality of words associated with the video game. The controller can further be programmed to match the user input to one or more words of the plurality of words of the multi-lingual library to generate a translated message in the determined language of the intended recipient and provide the translated message to a second accessory for presentation to the intended recipient in real-time.

FIG. 1 depicts an illustrative embodiment of a communication system 100 for delivering media content, which can include video games. It is contemplated by the present disclosure that other media content can be delivered by the system 100, such as, for example, audio content, moving image content (e.g., 2D or 3D videos), still image content, and combinations thereof. It is contemplated that the present disclosure can apply to any present or next generation over-the-air and/or landline media content services system. Multiple forms of media services can be offered to media devices over landline technologies such as those described above. Additionally, media services can be offered to media devices by way of a wireless access base station operating according to wireless access protocols, such as Wireless Fidelity (WiFi), or cellular communication technologies such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on). Other present and next generation wide area wireless network technologies are contemplated by the present disclosure.

System 100 can include a first gaming device 120 having one or more accessories (e.g., first accessory 125 and second accessory 135) operably coupled thereto. The first gaming device 120 can be of various types of computing devices, including a gaming console, a desktop computer, a laptop computer, a server, a mainframe computer, a cellular phone, a personal digital assistant, and/or a media player. The accessories 125 and 135 can be provided with components for the delivery of messages between gamers. For instance, first and second accessories 125 and 135 can each include a headset 140 with a microphone and speaker(s), which allow for input of a voice message and playing of voice messages. The headsets 140 can be wired and/or wireless devices. It should be understood that the headsets 140 are one example of components that can be used for delivery of audio messages, but the present disclosure contemplates that other components can also be utilized, such as a microphone and speaker integrated into the first accessory and/or the gaming console.

System 100 can also include one or more second gaming devices 130 in communication with the first gaming device 120. Each of the second gaming devices 130 can include the second accessories 135 with headsets 140 or other components to facilitate receipt and delivery of messages between gamers. The physical location of the gaming devices 120 and 130 can vary. For instance, the gaming devices 120 and 130 can be remote from each other and/or can be located within the same area or building.

The gaming devices 120 and 130 can be in communication with each other via network 150. The type of network 150 can vary. For example, network 150 can include the Internet and/or a service provider network. In another embodiment, network 150 can include a home or Local Area Network. In another embodiment, the network 150 can be a hardwire connection between gaming devices located in proximity to each other. Network 150 can comprise various devices (such as routers, gateways, servers and so forth). Network 150 can operate according to various protocols (such as Ethernet, IP, TCP, UDP, ICMP, HTTP, FTP, IMAP, and so forth) in order to allow delivery of messages between the gaming devices 120 and 130 and/or establishing gaming sessions between the devices such that users of the first and second gaming devices can interact in the video game.

In one embodiment, first gaming device 120 can include, or otherwise be in communication with, a translator 190 for translating messages from a user of the first accessory 125. The messages can be voice communications that are received by the first gaming device 120, such as through headset 140. The messages can also be generated without recording, or otherwise receiving, a voice communication from the user of first accessory 140. For instance, a user input at first accessory 125 can be non-speech, such as depressing particular a button(s) of the first accessory that generates a message. In one embodiment, macros can be configured which represent messages to be delivered to other gamers. The macros can then be implemented by the user of first accessory 125 by a particular manipulation of the first accessory, such as depressing a particular combination of buttons.

Translator 190 can be integrated with the first gaming device 120, such as a controller of the gaming device being programmed to function as the translator 190, and/or can be a separate device. In one embodiment, the translator 190 can be a separate device that is removably connectable with the first gaming device 120, such as a removable adaptor that can be plugged into a port of the gaming device, such as a USB port. In another embodiment, the translator 190 can be in wireless communication with the first gaming device 120. In yet another embodiment, the translator 190 can be directly in communication with the first accessory 125 or can be in direct communication with the user of the first accessory 125 for receiving the messages.

Translator 190 can translate the message into one or more languages for presentation to the other gamers. For example, where the user input is a voice message then the translator 190 can apply voice recognition to determine the words of the message. As another example, where the message is a macro of an accessory or is a text message (such as entered using a keyboard or other text interface) then the translator need not apply voice recognition.

Translator 190 can identify corresponding words in another language for delivery to the intended recipients of the voice message. In one embodiment, the translator 190 can utilize a multi-lingual library, which includes a plurality of words in various languages. The multi-lingual library can be utilized as a look-up table for translating the message between languages. The library can be stored at various locations. For example, the library can be stored with the translator 190 and/or with a memory of the first gaming device 120. In another embodiment, the library can be stored remotely from the translator 190 and accessed when a translation is being performed. For example, a centralized library can be maintained using a remote server that is accessible by the translator 190, such as via the network 150. In another embodiment, the library can be a distributed database that is maintained by a number of different servers and accessible by translator 190.

Translator 190 can also apply other translation techniques in translating the message between languages. For example, in one embodiment the translator can apply grammatical rules to the message translation to achieve proper word order and so forth. In another embodiment, the translator 190 can correct messages for improper grammar or terminology, such as improper grammar in the original message or misspelled words in a text message.

In one embodiment, translator 190 of the first gaming device 120 can be utilized to translate messages being transmitted between gamers using the same first gaming device 120. In this example, the translation and delivery of the messages may be performed without utilizing the network 150, such as the first gaming device 120 directly receiving the original message from the first accessory 125 and/or the headset 140 and directly delivering the translated message to the headset 140 of the second accessory 135. However, the present disclosure contemplates utilizing the network 150 for translation between gamers of the same gaming device, such as to access the multi-lingual library or to access a remote server which performs the translation.

In another embodiment, the translator 190 of first gaming device 120 can receive the user input of the message and can translate the message using the multi-lingual library for delivery to the second gaming devices 130. The delivery of the translated messages can be by way of the network 150. In one embodiment, codes representative of a translated audio message can be transmitted to the second gaming devices 130 rather than transmitting the translated audio message. The codes can then be utilized by the second gaming devices to present the translated message, such as in a synthesized voice or text.

In yet another embodiment, the second gaming devices 130 can receive the user input and can perform the translation of the message utilizing a translator 190 of the second gaming devices. For instance, where the user input is a voice message recorded by headset 140 of first accessory 125, the second gaming devices 130 can receive audio signals of the voice message via the network 150. The translator 190 of each of the second gaming devices 130 can then apply voice recognition to the audio signals to generate a translated message for presentation to the gamers of the second gaming devices. As another example, where the user input is a text message or a message generated by a macro of the first accessory 125, the second gaming devices 130 can receive data signals representative of the message. Translator 190 can then translate the user input into the translated message without using voice recognition.

In another embodiment, system 100 can utilize a translator 190 of a remote server 175 for performing translation of messages between the gamers of the gaming device s 120 and 130. Similar to the message formats describes above, translator 190 of the remote server 175 can apply voice recognition to audio messages received from the first gaming device 120 or can perform translation without using voice recognition where a text message or accessory macro is received from the first gaming device. In one embodiment, the remote server 175 can transmit an audio and/or text message to the second gaming devices 130. In another embodiment, the remote server 175 can transmit code signals that represent the translated message, where the second gaming devices generate the translated message based on the code signals.

The present disclosure contemplates the use of various devices and combinations of devices to implement translator 190 and deliver translated messages between gamers. In one embodiment, network or device performance and/or other factors can be utilized to determine which translators 190 are to perform the translation. As an example, a gaming session can include a first gamer using the first gaming device 120, a second gamer using the second gaming device 130, and a third gamer using another second gaming device 130. The first gamer can transmit a message to the second gamer which is translated into the second gamer's language. The translation into the second gamer's language can be performed by a translator 190 of the first gaming device 120. However, to conserve computing resources of the first gaming device 120, the message can be translated into a different language of the third gamer by the other second gaming device 130 of the third gamer. In this example, the first gaming device 120 does not expend computing resources translating a message into the third gamer's language since the third gamer was not the intended recipient of the message. However, the third gamer can still participate in the communication, but does so through utilizing his or her own computing resources.

Figure 2:
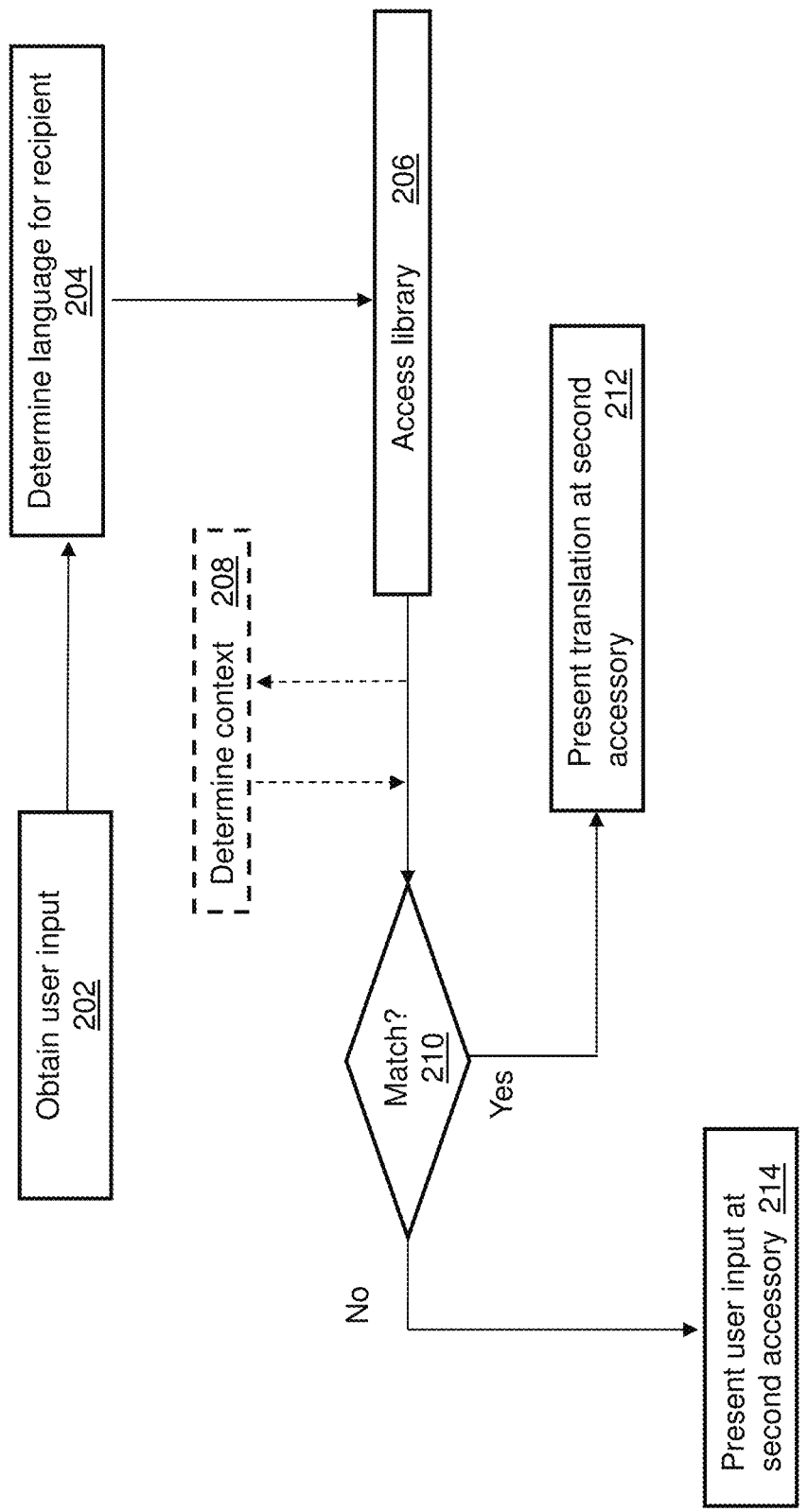
FIG. 2 depicts an illustrative embodiment operating in portions of the system of FIG. 1.

FIG. 2 depicts an illustrative method 200 operating in portions of the system 100 of FIG. 1. Method 200 can begin with step 202 in which a user input of a message is obtained. The user input can be of various formats, including a voice message, a text message and/or a macro generated by an accessory device where the macro represents a message. The message can be associated with a video game. For example, messages related to game play can be communicated between gamers using method 200.

In step 204, a language for the one or more intended recipients of the message can be determined. For example, languages can be designated in gamer profiles that are accessible by each of the gaming devices. Other techniques can be utilized to determine the language of the gamer, including transmitting requests between gaming devices. In another embodiment, voice communications transmitted from a particular gamer can be utilized to determine the language of the particular gamer.

In step 206, the translator 190 can access a multi-lingual library to perform the translation of the user input. As described above, the particular device implementing the translator 190 can vary and can include the source device, the recipient device and/or a remote server. Where the user input is a voice message then the translator 190 can apply voice recognition to determine words of the untranslated message. If the user input is not speech then the translator 190 can directly utilize the message along with the multi-lingual library.

In one embodiment in step 208, the translator 190 can utilize a context of the video game to assist in translation. For instance, a context of the video game can be determined based on the graphics being shown at the time the message was input by the user. As an example, a user may be moving along a beach as part of a number of different environments in a particular video game. If the user transmits a voice message stating "swim", the translator 190 can determine the context (e.g., beach with water) and can apply voice recognition in combination with the context to distinguish between "swim" and other words, such as "win." The context of the video game can also be applied to facilitate the translation other than when using voice recognition. For example, a user input may be a text message that is a misspelling, such as "wim." Based on the context of the video game at the time of the message being a beach with water, the translator can again distinguish between "swim" and "win."

If in step 210 the translator 190 identifies a match for the message in the multi-lingual library then method 200 proceeds to step 212 where the translation of the message is presented to the intended recipient. The presentation of the translated message can be performed in a number of different ways. For example, the translated message can be a human voice, synthesized speech and/or text (e.g., presented on the display device with the video game). In one embodiment, the format of the presentation can be selected by one of the source and the recipient of the message. In another embodiment, the translator 190 can apply grammar rules to matching words of the multi-lingual library to facilitate the translation.

If on the other hand in step 210 the translator 190 cannot identify a match for the message in the multi-lingual library then method 200 can proceed to step 214 where the untranslated message is presented to the intended recipient. In another embodiment, if a match is not determined then the translator 190 can request a search of other multi-lingual libraries. For example, if the first gaming device 190 cannot find a match for a voice message generated by a first gamer then the first gaming device can access or otherwise request a search of the multi-lingual library of the second gaming device 130 and/or the remote server 175 via the network 150.

Method 200 can present multiple translations of the same message to multiple gamers. The multiple translations can be performed by the same translator 190 or by different translators, such as using a distributed translation technique.

In one embodiment, the multi-lingual library can be populated based on words or phrases that are commonly used with particular video games. The library can be updated as new words or phrases are being used during gaming sessions. For example, where software updates including new actions or new graphics are provided to a video game, new words or phrases may more commonly be used with the updated video game. The library can be updated with translations for these new words or phrases.

In another embodiment, the multi-lingual library can be populated based on words or phrases suggested by the user. For example, a user can request particular words or phrases be translated into particular languages. The translation of the words or phrases can be determined and the library can be provisioned with these translations. In another embodiment, an absence of matches for a particular word or phrase meeting a threshold can trigger populating the library with a translation of the word or phrase.

Figure 3:
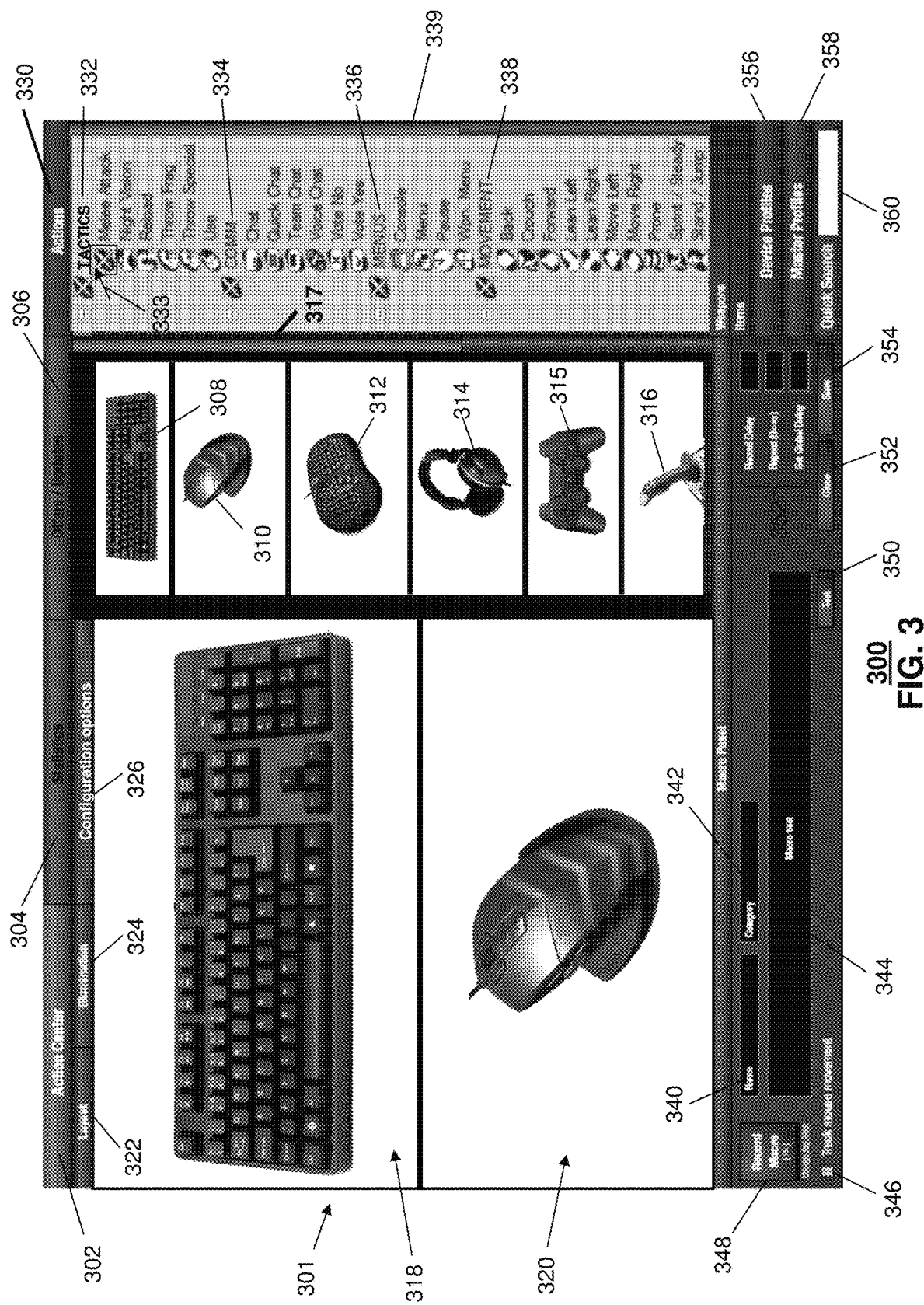
FIGS. 3-5 depict illustrative embodiments of a Graphical User Interface (GUI) generated by an Accessory Management Software (AMS) application according to the present disclosure.
Figure 4:
Figure 5:
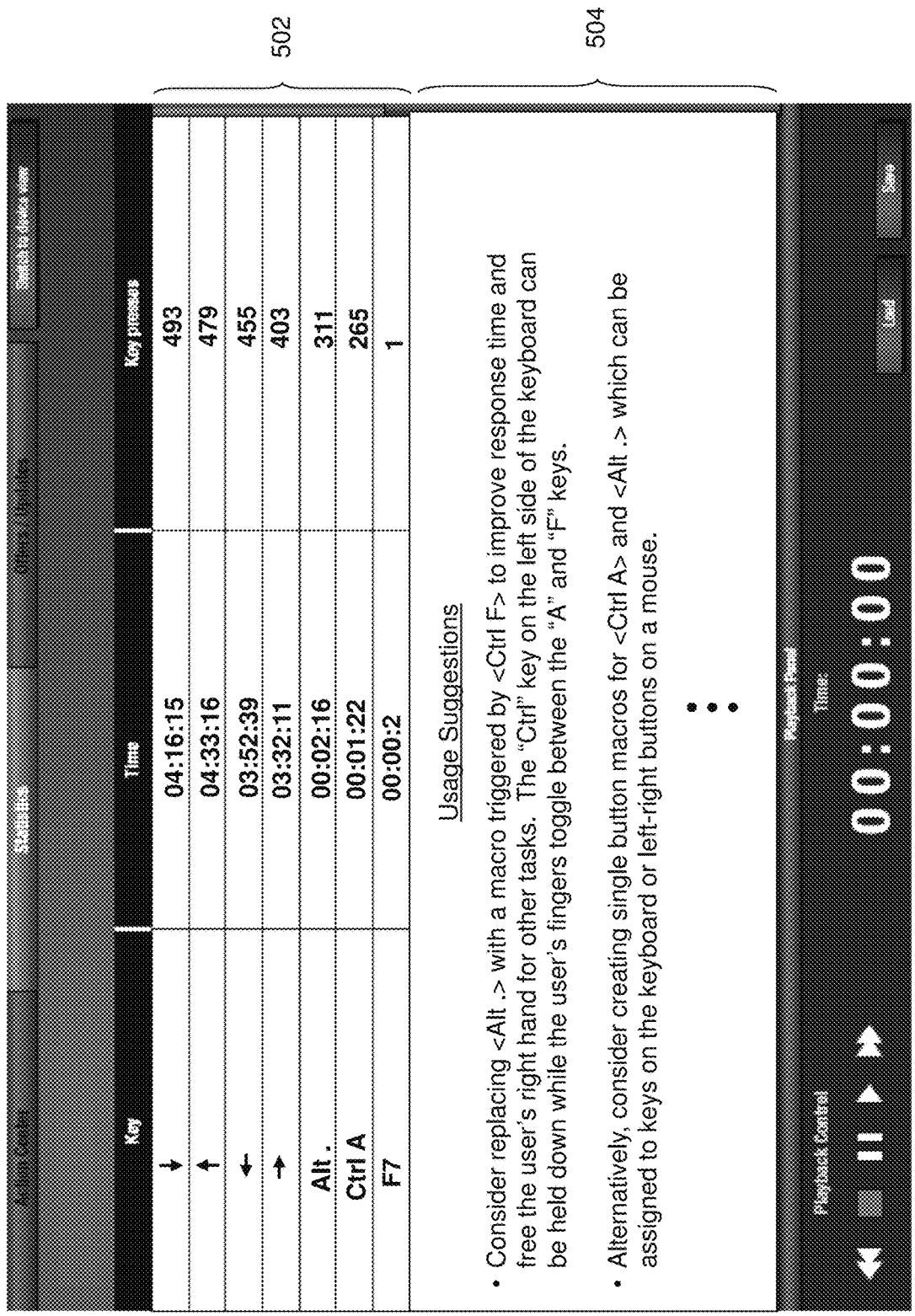

FIGS. 3-5 depict illustrative embodiments of a Graphical User Interface (GUI) generated by an Accessory Management Software (AMS) application according to the present disclosure. The AMS application can operate in a computing device such as a desktop computer, a laptop computer, a server, a mainframe computer, and/or a gaming console. A gaming console can represent a gaming device such as a Playstation 3™, a Wii™, or an Xbox360™. Other present and next generation gaming consoles are contemplated. The AMS application can also operate in other computing devices with less computing resources such as a cellular phone, a personal digital assistant, or a media player (such as an iPOD™). From these illustrations it would be apparent to an artisan with ordinary skill in the art that the AMS application can operate in any device with computing resources.

Figure 6:
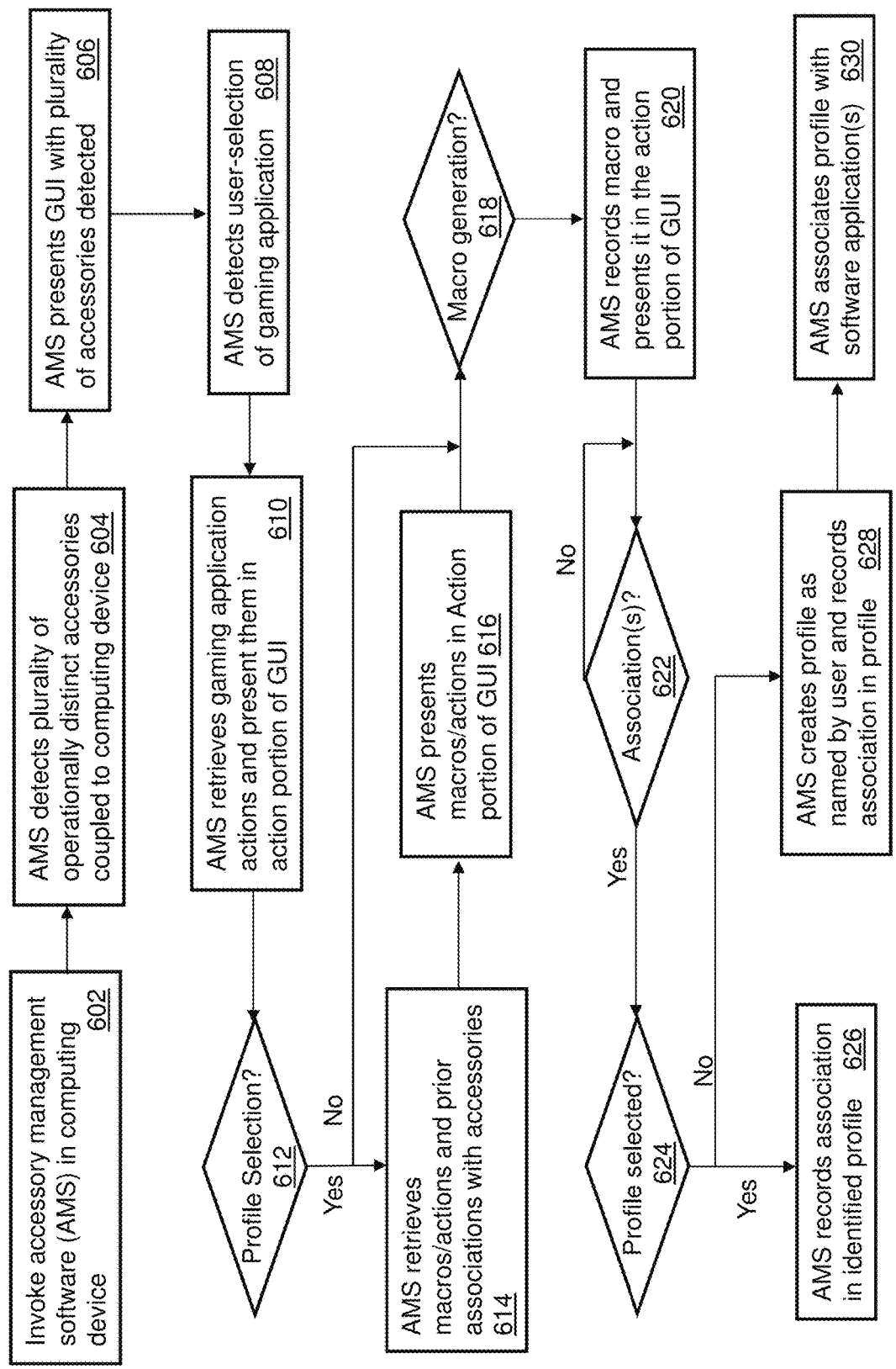
FIGS. 6-8 depict illustrative methods describing the operation of the AMS application.
Figure 7:
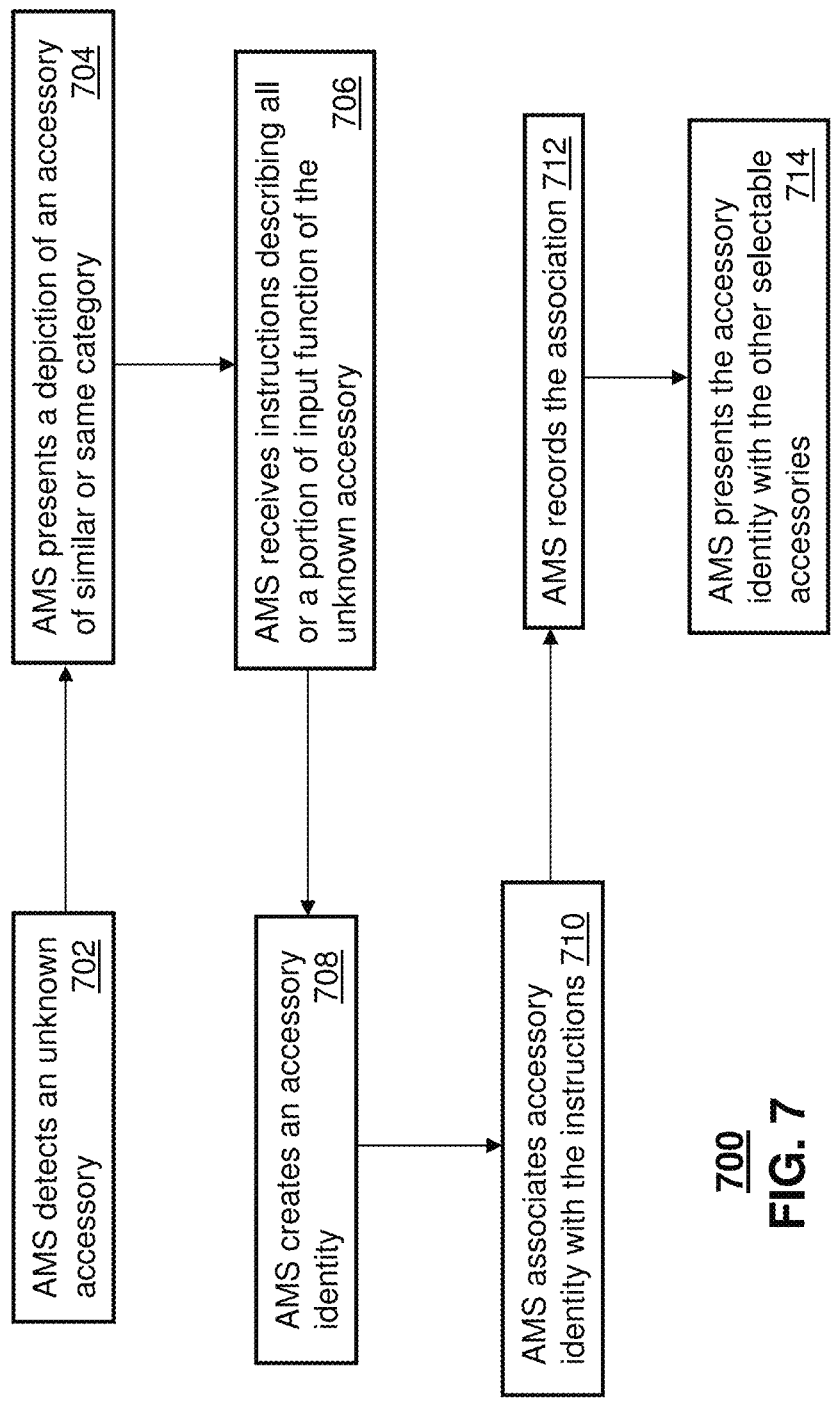
Figure 8:
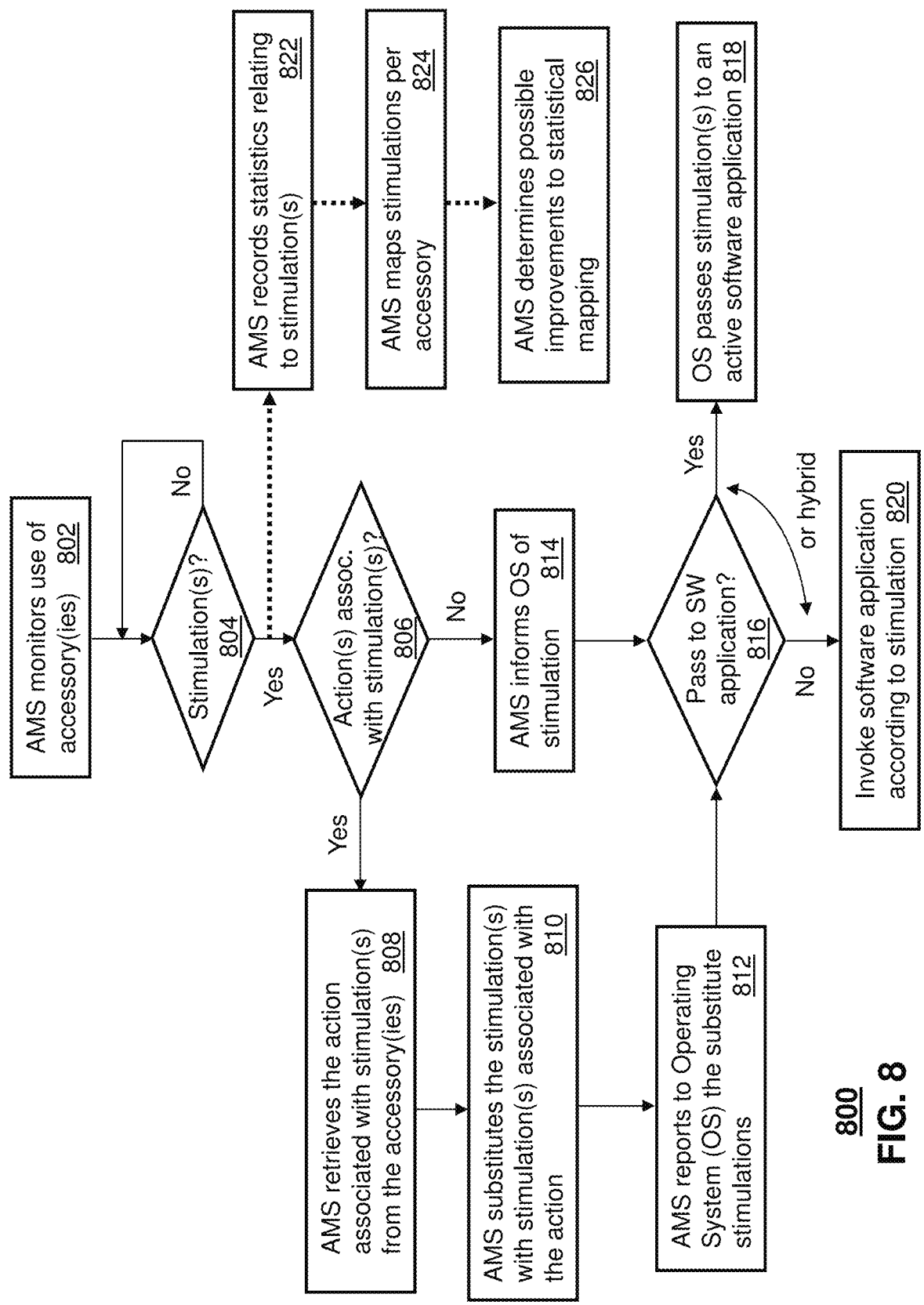

FIGS. 6-8 depict illustrative methods 600-800 describing the operation of the AMS application as shown in FIGS. 3-5. Method 600 can begin with step 602 in which the AMS application is invoked in a computing device. The invocation step can result from a user selection of the AMS application from a menu or iconic symbol presented on a desktop of the computing device by an operating system (OS) managing operations thereof. In step 604, the AMS application can detect by way of drivers in the OS a plurality of operationally distinct accessories communicatively coupled to the computing device. The accessories can be coupled to the computing device by a tethered interface (e.g., USB cable), a wireless interface (e.g., Bluetooth or Wireless Fidelity—WiFi), or combinations thereof.

In the present context, an accessory can represent any type of device which can be communicatively coupled to the computing device and which can control aspects of the OS and/or a software application operating in the computing device. An accessory can represent for example a keyboard, a gaming pad, a mouse, a gaming console controller, a joystick, a microphone, or a headset with a microphone—just to mention a few. The keyboard and gaming pad represent accessories of a similar category since their operational parameters are alike.

A mouse, on the other hand, represents an accessory having disparate operational parameters from the keyboard or gaming pad. For instance, the operational parameters of a keyboard generally consist of alphanumeric keys, control keys (e.g., Shift, Alt, Ctrl), and function keys while the operational parameters of a mouse consist of navigation data generated by a tracking device such as a laser sensor, buttons to invoke GUI selections, and settings thereof (e.g., counts or dots per inch, acceleration, scroll speed, jitter control, line straightening control, and so on). Such distinctions can be used to identify disparate categories of accessories. The joysticks, game controllers or any other input devices represent additional categories of accessories supported by the AMS.

In step 606, the AMS application presents a GUI 301 such as depicted in FIG. 3 with operationally distinct accessories such as the keyboard 308 and mouse 310. The GUI 301 presents the accessories 308-316 in a scrollable section 317. Although the present disclosure contemplates the use of other GUI configurations. One or more accessories can be selected by a user with a common mouse pointer. In this illustration, the keyboard 308 and mouse 310 were selected with a mouse pointer for customization. Upon selecting the keyboard 308 and mouse 310 in section 317, the AMS application presents the keyboard 308 and mouse 310 in split windows 318, 320, respectively, to help the user during the customization process.

In step 608, the AMS application can be programmed to detect a user-selection of a particular software application such as a game. This step can be the result of the user entering in a Quick Search field 360 the name of a gaming application (e.g., World of Warcraft™). Upon identifying a gaming application, the AMS application can retrieve in step 610 from a remote or local database gaming application actions which can be presented in a scrollable section 339 of the GUI represented as "Actions" 330. The actions can be tactical actions 332, communication actions 334, menu actions 336, and movement actions 338, or any other types of actions, which can be used to invoke and manage features of the gaming application.

The actions presented descriptively in section 330 of the GUI can represent a sequence of accessory input functions which a user can stimulate by button depressions, navigation or speech. For example, depressing the left button on the mouse 310 can represent the tactical action "Reload", while the simultaneous keyboard depressions "Ctrl A" can represent the tactical action "Melee Attack". For ease of use, the "Actions" 330 section of the GUI is presented descriptively rather than by a description of the input function(s) of a particular accessory.

Any one of the Actions 330 can be associated with one or more input functions of the accessories by way of a simple drag and drop action. For instance, a user can select a "Melee Attack" by placing a mouse pointer 333 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 308 or mouse 310 to make an association with an input function of one of these accessories.

For example, the user can drag the Melee Attack symbol to the right mouse button thereby causing an association between the selection of the right mouse button and the gaming action of a Melee Attack. When the right button of the mouse 310 is selected during normal operation, the AMS application can detect the selection as a "trigger" to generate the key sequence "Ctrl A" which is understood by the gaming application as request for a Melee Attack. The gaming application receives from the AMS application by way of an operating system the "Ctrl A" sequence as if it had been generated by a Qwerty keyboard.

With this in mind, attention is directed to step 612 where the AMS application can respond to a user selection of a profile. A profile can be a device profile or master profile invoked by selecting GUI button 356 or 358, each of which can identify the association of actions with input functions of one or more accessories. If a profile selection is detected in step 612, the AMS application can retrieve macro(s) and/or prior associations of actions with the accessories as defined by the profile. The actions and/or macros defined in the profile can also be presented in step 616 by the AMS application in the actions column 330 of the GUI 301 to modify or create new associations.

In step 618, the AMS application can also respond to a user selection to create a macro. A macro in the present context can represent a subset of actions that can be presented in the Actions column 330. Any command which can be recorded by the AMS application can be used to define a macro. A command can represent a sequence of input functions of an accessory, identification of a software application to be initiated by an operating system (OS), or any other recordable stimulus to initiate, control or manipulate software applications. For instance, a macro can represent a user entering the identity of a software application (e.g., instant messaging tool) to be initiated by an OS.

A macro can also represent a message to be delivered to another gamer. GUI 301 can be used to configure delivery of the message. For instance, the message can be recordable speech delivered by a microphone to one or more other gamers. As another example, the message can be synthesized speech delivered to one or more other gamers. In yet another example, the message can be text delivered. GUI 301 allows particular actuations of the accessory to represent the particular message. For instance, the message "duck" can be programmed as a macro using the GUI 301. The message can then be delivered to the other gamers when the source accessory is actuated in such a way to request delivery of the message (e.g., depressing the corresponding button(s) associated with the user-generated macro). Other preferences associated with the message can also be selected using GUI 301. For instance, a type of voice (e.g., female or male voice) can be selected for messages that are delivered as audio signals which are not in the voice of the user. As another example of preference selection, a font can be selected by a user for messages that are delivered as text.

In another embodiment, the macro and corresponding message can be generated and stored by the gaming console without user provisioning, such as based on messages that have been already associated with a particular video game. For instance, a video game can be associated with a set of typical user messages, such as "duck", "run", "stay here" and so forth. These messages can further be associated with particular accessory actuations, by the user and/or pre-configured. In one example, GUI 301 can present a list of typical messages for a video game and a user can select the accessory actuation to deliver the message. In another example, the accessory actuation can be pre-configured by the system with the messages. In one embodiment, GUI 301 can be used to change the pre-configuration of the message macros, including changing the corresponding accessory actuations or removing one or more messages from the group of messages that can be delivered.

As described above with respect to system 100, the message can be translated to facilitate communication with other gamers speaking one or more different languages. The translation can be performed by the source device, the recipient device, and/or a remote server in communication with the source and recipient devices. In one embodiment, GUI 301 can be used to configure translations of the messages. For instance, a user may desire only certain translations of the user's messages be performed, including based on a selection of words that are to be translated or a selection of languages that are to be utilized for the translation. In one embodiment, GUI 301 can also be used to designate particular words that are not to be translated.

As another example, GUI 301 can be used so that a preferred language is designated by a user. In one embodiment, source devices that intend to send a message to the other gamers can then utilize the preferred language information (which can be delivered to the other gamer devices such as when the gaming session is established that includes the various parties) to perform the translation. In another embodiment, the GUI 301 can provide the preferred language information to a remote server, which performs translations of messages associated with a gaming session.

In yet another embodiment a macro can represent recordable navigation of an accessory such as a mouse or joystick, recordable selections of buttons on a keyboard, a mouse, or a mouse pad, and so on. Macros can also be combinations of the above illustrations. Macros can be created from the GUI 301 by selecting a "Record Macro" button 348. The macro can be given a name and category in user-defined fields 340 and 342.

Upon selecting the Record Macro button 348, a macro can be generated by selection of input functions on an accessory (e.g., Ctrl A, speech, etc.) and/or by manual entry in field 344 (e.g., typing the name and location of a software application to be initiated by an OS). Once the macro is created, it can be tested by selecting button 350 which can repeat the sequence specified in field 344. The clone button 352 can be selected to replicate the macro sequence if desired. Fields 352 can also present timing characteristics of the stimulation sequence in the macro with the ability to customize such timing. Once the macro has been fully defined, selection of button 354 records the macro in step 620. The recording step can be combined with a step for adding the macro to the associable items Actions column 330, thereby providing the user the means to associate the macro with input functions of the accessories.

In step 622, the AMS application can respond to drag and drop associations between actions and input functions of the keyboard 308 and the mouse 310. If an association is detected, the AMS application can proceed to step 624 where it can determine if a profile has been identified in step 612 to record the association(s) detected. If a profile has been identified, the associations are recorded in said profile in step 626. If a profile was not been identified in step 612, the AMS application can create a profile in step 628 for recording the detected associations. In the same step, the user can name the newly created profile as desired. The newly created profile can also be associated with one or more software applications in step 630 for future reference.

The GUI 301 presented by the AMS application can have other functions. For example, the GUI 301 can provide options for layout of the accessory selected (button 322), how the keyboard is illuminated when associations between input functions and actions are made (button 334), and configuration options for the accessory (button 326). Configuration options can include operational settings of the mouse 310 such as Dots Per Inch or Counts Per Inch, and so on. The AMS application can adapt the GUI 301 to present more than one functional perspective. For instance, by selecting button 302, the AMS application can adapt the GUI 101 to present a means to create macros and associate actions to accessory input functions as depicted in FIG. 3. Selecting button 304 can cause the AMS application to adapt the GUI 301 to present statistics in relation to the usage of accessories as depicted in FIGS. 4-5. Selecting button 306 can cause the AMS application to adapt the GUI 301 to present promotional offers and software updates.

It should be noted that the steps of method 600 in whole or in part can be repeated until a desirable pattern of associations of actions to input functions of the selected accessories has been accomplished. It would be apparent to an artisan with ordinary skill in the art that there can be numerous other approaches to accomplish similar results. These undisclosed approaches are contemplated by the present disclosure.

FIG. 7 depicts a method 700 in which the AMS application can be programmed to recognize unknown accessories so that method 600 can be applied to them as well. Method 700 can begin with step 702 in which the AMS application detects an unknown accessory such as a new keyboard from an unknown vendor by way of a communicative coupling to a computing device from which the AMS application operates. The AMS application in this instance can receive an identity from the keyboard or the operating system which is not known the AMS application. Upon detecting an unknown accessory, the AMS application in step 704 can present a depiction of an accessory of similar or same category in response to a user providing direction as to the type of accessory (by selecting for example a drop-down menu). Alternatively, or in combination with the user instructions, the AMS application can determine from the information received from the unknown accessory an accessory type.

In step 706 the AMS application can receive instructions describing all or a portion of the input functions of the unknown accessory. These instructions can come from a user who defines each input function individually or responds to inquiries provided by the AMS application. The AMS application can for example make an assumption as to the keyboard layout and highlight each key with a proposed function which the user can verify or modify. Once the AMS application has been provided instructions in step 706, the AMS application can create an accessory identity in step 708 which can be defined by the user. In steps 710 and 712, the AMS application can associate and record the accessory instructions with the identity for future recognition of the accessory. In step 714, the AMS application can present a depiction of the new accessory with its identity along with the other selectable accessories in section 317.

Method 700 can provide a means for universal detection and identification of any accessory which can be used to control or manage software applications operating in a computing device.

FIG. 8 depicts a method 800 for illustrating the AMS application responding to input function stimuli (triggers) of accessories. Method 800 can begin with step 802 in which the AMS application monitors the use of accessories. This step can represent monitoring the stimulation of input functions of one or more accessories communicatively coupled to a computing device from which the AMS application operates. The input functions can correspond to button depressions on a keyboard, gaming pad, or navigation device such as a mouse. The input functions can also represent navigation instructions such as mouse or joystick movements. The input functions can further represent speech supplied by a microphone singly or in combination with a headset. Other existing or future input functions of an accessory detectable by the AMS application are contemplated by the present disclosure. The AMS application can monitor input functions by for example processing human interface device (HID) reports supplied by the accessories to the computing device.

Once one or more stimulations have been detected in step 804, the AMS application can proceed to step 806 to determine if action(s) have been associated with the detected stimulation(s). If for example the stimulations detected correspond to keyboard and mouse button depressions, the AMS application can determine if actions have been associated and recorded for such stimulations. If these stimulations "trigger" one or more actions, the AMS application can proceed to step 808 where it retrieves the stimulation definition of these actions for each accessory reporting a stimulation. In step 810, the AMS application can substitute the detected stimulations with the stimulations defined by the action.

To illustrate this substitution, suppose for example that the detected stimulation was "Ctrl A" simultaneously depressed on a keyboard. Suppose further that an action associated with this stimulus consists of a macro that combines mouse clicks with a navigation of the mouse (e.g., moving the mouse quickly in a forward motion for a given distance), and a request to invoke an instant messaging (IM) session with a particular individual using Skype™ or some other common IM tool. In step 810, the AMS application would substitute "Ctrl A" for stimulations consisting of the mouse clicks, navigation and a request for an IM application. The substitute stimulations would then be reported in step 812 to an operating system (OS).

In step 816, the OS can determine whether to pass the substitute stimulations to an active software application in operation (e.g., a gaming application) and/or to invoke another software application. The active software application can be operating from the same computer system from which the OS and the AMS application operate or can be operating at a remote system such as an on-line server or family of servers (e.g., World of Warcraft) awaiting stimulation data from the computer system. In this illustration, the macro comprises both stimulation feedback for the active software application and a request to initiate an IM session. Accordingly, the OS conveys in step 818 the mouse stimulation signals to the active software application (e.g., gaming application), and in a near simultaneous fashion invokes the IM session in step 820 with a specific individual (or organization).

Referring back to step 806, the illustrations above cover a scenario in which the AMS application has detected an association of actions to accessory stimuli. If however the AMS application does not detect such an association, then the detected stimulus (or stimuli) supplied by one or more accessories is transmitted to the OS in step 814. For example, it may be that a stimulation based on the depressions of "Ctrl A" has no particular association to an action. In this case, the AMS application passes this stimulation to the OS with no substitutes. In step 816 the OS can determine if this stimulation invokes a new software application in step 820 or is conveyed to the previously initiated software application.

Contemporaneous to the embodiments described above, the AMS application can also record in step 822 statistics relating to the detected accessory stimulations. A portion of the AMS application can operate as a background process which performs statistical analysis on the stimulations detected. By selecting button 304 in FIG. 3, the AMS application can provide an updated GUI which illustrates the usage of input functions of one or more accessories for which stimulations were detected in step 804. For ease of illustration, only a keyboard accessory is shown. In this illustration, certain keys (references 404, 406, 408, 410) on the keyboard are color-coded to illustrate the frequency of usage of these keys.

A color scale 403 defines the frequency of usage of the input functions of the keyboard. The first end of the scale (navy blue) represents a single detected depression, while an opposite end of the scale (bright red) represents detected depressions. Based on this scale, the AMS application maps by color in step 824 stimulations of the keyboard. For example, the key grouping 408 depict a color coding with the highest detectable usage, while the F7 key (reference 410) indicates the fewest depressions. Keys having zero depressions are not color coded to readily identify the color mapping of keys which were used at least once.

The AMS application provides additional functions in a playback panel of the GUI which can help a user understand how the color coded keys were used during an active software application such as a video game. In this section of the GUI, the AMS application can present the user with a playback control function 402 which the user can select to replay, pause, forward or rewind the usage of these keys. When usage playback is selected, the user can for instance see the color coded keys highlighted in real-time with a temporary white border to visualize how the keys were selected. A time clock 404 provides the user the elapsed time of the playback sequence. Button 412 allows the user to retrieve statistics from other sessions, while button 414 provides the user a means to save statistics from a given session.

The GUI of FIG. 4 could have been shown as a split screen with all accessories which generated one or more detected stimulations (e.g., keyboard, mouse, and microphone), each providing statistical symbolic results as described above for the keyboard. Although not shown, split screen embodiments are contemplated by the present disclosure for the GUI of FIG. 4.

In addition to a symbolic representation as shown in FIG. 4, the AMS application can provide the user a means to visualize raw statistics in a table format such as shown in FIG. 5 by selecting button 412. The table format shows raw data in section 502 and possible suggestions in section 504 for improving user performance which can be generated by the AMS application in step 826. Section 502 can be presented in a table format with a column identifying the key being analyzed, its usage, and number of key presses. The user can ascertain from this table the most and least frequently used keys as well as other identifiable patterns.

The AMS application can utilize an understanding of the layout of the accessory (in this case, the keyboard) to determine from the statistics ways that the user can improve response time or ergonomic use. For example, the AMS application can determine from a layout analysis that the key combination <Alt .> can be reassigned to a macro based on the trigger <Ctrl F> which could provide the user a faster response time and free up the user's right hand for other tasks. The AMS application can also provide alternative suggestions. For example, the AMS application can also suggest creating single button macros for each of the key combinations <Alt .> and <Ctrl A> which can be assigned to keys on the keyboard or left and right buttons of a mouse. The latter suggestion of assigning macros to the mouse can help the user free up his/her left hand.

The AMS application can utilize present and next generation algorithms to determine how to improve response times and ergonomic usage of accessory devices. The AMS application can for example have at its disposal an understanding of the layout of each accessory, the type of software being controlled by the accessory (e.g., World of Warcraft), type of operations commonly used to control the software (e.g., known actions as shown in the actions column 330 of FIG. 3), an understanding of the associations made by other users (e.g., gamers) to improve their performance when controlling the software, and so on. The AMS application can also be adapted to communicate with the active software application by way of an Application Programming Interface (API) to receive additional usage statistics from the software which it can in turn use to improve the user's performance. The AMS application can also utilize common statistical and behavior modeling techniques to predict the behavior of the user and responses from the software application to identify possible ways to improve the user's performance.

From these illustrations, it would be apparent to an artisan of ordinary skill in the art that innumerable algorithms can be developed to analyze accessory usage and thereby suggest improvements. These undisclosed embodiments are contemplated by the present disclosure.

From the foregoing descriptions, it would be evident to an artisan with ordinary skill in the art that the aforementioned embodiments can be modified, reduced, or enhanced without departing from the scope and spirit of the claims described below. For example, method 600 can be adapted to define more than one programmable layer for an accessory. Such a feature can extend the functionality of an accessory into multi-layer paradigms of input functions. The GUI of FIG. 3 can be adapted so that a user can specify more than one programmable layer for a specific accessory.

The user can also specify which layer to present in FIG. 3 while associating actions. If for instance layer 1 is shown, the GUI of FIG. 3 can present the actions associated in this layer by presenting descriptors superimposed on the input functions (e.g., buttons or keys). When the user switches to layer 2 (e.g., by selecting from a drop-down menu the layer of interest) the accessory can be shown in the GUI with a different set of associated actions. The user can define a macro or identify a key sequence to switch between layers when the accessory is in use.

The trigger for switching between layers can be a toggle function (e.g., selecting the tab key on a Qwerty keyboard) to switch between layers in a round robin fashion (layer 1 4 layer 2 4 layer 3 to layer 1 4 and so on). Alternatively, the user can define a hold and release trigger to switch between layers. In this embodiment, the user moves to another layer while pressing a button (e.g., a "Shift" key) and returns to the preceding layer upon its release. In yet another embodiment, the trigger to switch layers can be defined differently per layer. The user can for example select the letter "A" in layer 1 to proceed to layer 2, and select the letter "B" in layer 2 to return to layer 1 or proceed to yet another layer 3. There can be numerous combinations of layers and triggers which can be defined to substantially expand the capability of single accessory. Additionally, triggers can be of any kind, tactile, speech, etc.

In another embodiment, method 600 can be adapted so that a user can define super macros and/or super profiles. A super macro can represent nested macros (combinations of macros). Method 600 can be adapted so that the user can customize the timing for executing nested macros. Similarly, a super profile can represent nested profiles (combinations of profiles). A super profile can for example comprise sub-profiles, each sub-profile defining associations of actions to input functions of a particular accessory.

In yet another embodiment, method 600 can be adapted to establish audio profiles for headset accessories. When a user selects a headset accessory such as 314, GUI 301 can be adapted to provide the user options to establish a sound output (equalizer) setting to optimize performance for a particular gaming application. For instance GUI 101 can present an equalizer so that the user can raise the volume of high frequencies to an enemy's footsteps from a longer distance in a gaming application.

The foregoing embodiments are a subset of possible embodiments contemplated by the present disclosure. Other suitable modifications can be applied to the present disclosure. Accordingly, the reader is directed to the claims for a fuller understanding of the breadth and scope of the present disclosure.

Figure 9:
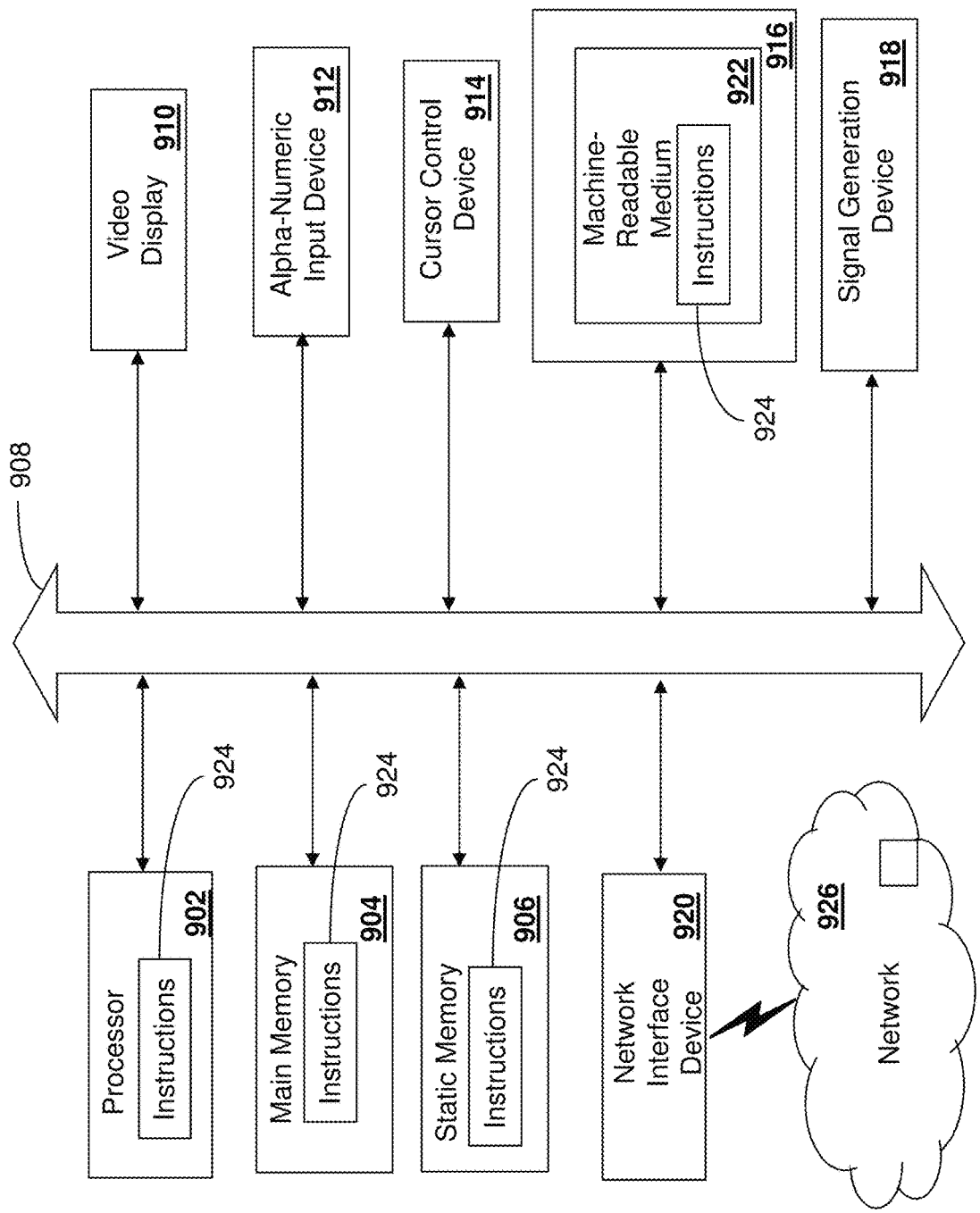
FIG. 9 depicts an illustrative diagrammatic representation of a machine in the form of a computer system within which a set of instructions, when executed, may cause the machine to perform any one or more of the methodologies disclosed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and any equivalents. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
a processing system including a processor; and
a memory that stores executable instructions that, when executed by the processing system, facilitate performance of operations, comprising:
receiving, by a first accessory operably coupled with a first computing device, a user input from a second accessory operably coupled with a second computing device, wherein the user input is associated with a program operating on the first computing device and on the second computing device and communicating between the first computing device and the second computing device across a network, and wherein the user input comprises a message delivered within an operation of the program across the network;
generating a translation of the user input based on a first language of the user input when the user input was received on the second computing device, wherein the translation is generated using a multi-lingual library to translate the first language of the user input to a second language of a user of the first accessory; and
providing the translation to the first computing device to be presented by the first computing device.

2. The system of claim 1, wherein the user input comprises a text input to the second accessory.

3. The system of claim 2, wherein the generating the translation comprises generating an audio output of the text input from the first language in the second language, and wherein the first computing device provides the audio output via a speaker.

4. The system of claim 2, wherein the generating the translation comprises generating an text output of the text input from the first language to the second language, and wherein the first computing device provides the text output via a display associated with the first computing device.

5. The system of claim 1, wherein the user input comprises an audio input to the second accessory.

6. The system of claim 5, wherein the generating the translation comprises generating an audio output of the audio input from the first language in the second language, and wherein the first computing device provides the audio output via a speaker.

7. The system of claim 5, wherein the generating the translation comprises generating an text output of the audio input from the first language to the second language, and wherein the first computing device provides the text output via a display associated with the first computing device.

8. The system of claim 1, wherein the operations further comprise determining a context of the user input according to a graphic presentation of the program by the second computing device at a time the user input was received by the second accessory.

9. The system of claim 8, wherein the generating the translation comprises comparing the user input to the context to determine a match for the user input in the multi-lingual library for the first language.

10. The system of claim 8, wherein the generating the translation comprises comparing the user input to the context to determine an appropriate message based on a present situation in the program according to the graphic presentation.

11. The system of claim 1, wherein the generating the translation comprises, responsive to a determination that a match in the first language is not found for the user input, providing the user input to the first accessory without generating the translation.

12. The system of claim 1, wherein the operations further comprise:
obtaining an identity of an intended recipient of the user input; and
determining a language for the intended recipient based on the identity as a determined first language, wherein the generating the translation comprises accessing the multi-lingual library based on the determined first language.

13. A method, comprising:
transmitting, by a processing system comprising a processor, a user input for a first intended recipient from a first accessory operably coupled with a first computing device to a remote server, wherein the user input is associated with a program operating on the first computing device, wherein the user input comprises a message from the first accessory to a second accessory of a second computing device of the first intended recipient, and wherein the program is being performed on the second computing device;
generating, by the processing system, a first translated message of the user input based on a first language of the user input, wherein the first translated message is generated using a multi-lingual library to translate the first language of the user input to a second language of a user of the second accessory; and
providing, by the processing system, the first translated message to the second computing device to be presented to the second accessory.

14. The method of claim 13, wherein the generating the first translated message comprises generating an audio output of the user input from the first language in the second language, and wherein the second accessory provides the audio output via a speaker.

15. The method of claim 13, wherein the generating the first translated message comprises generating a text output of the user input from the first language in the second language, and wherein the second computing device provides the text output via a display associated with the second computing device.

16. The method of claim 13, further comprising:
determining, by the processing system, a second intended recipient of the user input;
generating, by the processing system, a second translated message based on the first language of the user input to a third language for a third accessory operably coupled with a third computing device performing the program for presentation to the second intended recipient; and
providing, by the processing system, the second translated message to the third computing device to be presented to the second intended recipient,
wherein the second language is based on a first selected language of the first intended recipient of the user input based on a first identity of the first intended recipient, and
wherein the third language is based on a second selected language of a second intended recipient of the user input based on a second identity of the second intended recipient.

17. A machine-readable storage medium, comprising executable instructions that, when executed by a processing system including a processor, facilitate performance of operations, comprising:
receiving a user input from a computing device, wherein the computing device presents a graphical user interface, wherein the graphical user interface receives user actuations of a first accessory operably coupled with a first computing device while accessing a program on the computing device, and wherein the user input comprises a message from the first accessory to a second accessory of a second computing device performing the program for a first intended recipient;
determining a language of the first intended recipient based on an identity of the first intended recipient;
matching the user input to words of a plurality of words of a multi-lingual library to generate a translated message; and
providing the translated message to the second accessory for presentation to the first intended recipient.

18. The machine-readable storage medium of claim 17, wherein the computing device obtains the user input that was inputted into the first accessory, wherein the first accessory provides a user interface for user interaction with the program.

19. The machine-readable storage medium of claim 17, wherein the operations further comprise updating the multi-lingual library based on words or phrases suggested by the user input according to a context of the program a time when the user input was received.

20. The machine-readable storage medium of claim 17, wherein the providing of the translated message to the second accessory is performed in real time, and wherein the first accessory and the second accessory comprise one of a keyboard, a gaming pad, a mouse, a gaming console controller, a joystick, a microphone, a headset with a microphone, or any combination thereof.

* * * * *